(12) United States Patent
Sander

(10) Patent No.: US 6,328,915 B1
(45) Date of Patent: Dec. 11, 2001

(54) METHOD FOR INTERNAL MOLDING AND RAPID DRYING OF AEROGEL HONEYCOMB CATALYST MONOLITHS

(76) Inventor: Matthew T. Sander, 10361 Stablehand Dr., Cincinnati, OH (US) 45242

( * ) Notice: Subject to any disclaimer, the term of this patent is extended or adjusted under 35 U.S.C. 154(b) by 0 days.

(21) Appl. No.: 09/294,126

(22) Filed: Apr. 19, 1999

Related U.S. Application Data

(62) Division of application No. 08/761,649, filed on Dec. 6, 1996, now Pat. No. 5,972,254.

(51) Int. Cl.[7] ........................................................ B28B 7/04
(52) U.S. Cl. ............................ 264/39; 264/229; 264/621; 501/95.2
(58) Field of Search .............................. 264/39, 621, 229; 501/95.2

(56) References Cited

U.S. PATENT DOCUMENTS

| | | | | |
|---|---|---|---|---|
| 5,207,814 | * | 5/1993 | Cogliati | 65/18.3 |
| 5,242,647 | * | 9/1993 | Poco | 264/225 |
| 5,306,555 | * | 4/1994 | Ramamurthi | 428/289 |
| 5,395,805 | * | 3/1995 | Droege | 501/72 |
| 5,538,931 | * | 7/1996 | Heinrichs | 502/234 |

* cited by examiner

Primary Examiner—Christopher A. Fiorilla

(57) ABSTRACT

A method of internal molding and decreased supercritical fluid drying times for aerogels and exergels by means of using gas porous molding features that are compatible with the prestressed fiber reinforcing system.

3 Claims, 7 Drawing Sheets

20

22

24

26

METHOD FOR INTERNAL MOLDING AND RAPID DRYING OF AEROGEL HONEYCOMB CATALYST MONOLITHS

This is a division of Ser. No. 08/761,649, filed Dec. 6, 1996 now U.S. Pat. No. 5,972,254. Subject matter directed exclusively to the parent case had been deleted.

BACKGROUND—FIELD OF INVENTION

This invention relates to monolithic aerogel catalysts and composite materials, specifically to a method to allow internal molding and facilitate rapid drying for aerogel honeycomb catalyst monoliths.

BACKGROUND—DESCRIPTION OF PRIOR ART

Aerogel catalysts are generally used in the form of fine powders or lumps which are fragile, loose, and difficult to handle in chemical reactors. Severe pressure drops and heat and mass transfer limitations occur in fixed bed reactors where aerogels are used in these types of physical forms. Other alternative forms such as aerogel coatings on rashig rings or aerogels being embedded into alundum boiling stones have been tried with limited success to assist in improving on the above limitations. Fluidized bed reactors have also been piloted using the "lumps" form of aerogels with limited success.

European Patent 0186149 by Stauffer Chemical Company describes the preparation of non-aged, inorganic oxide containing aerogels. The method comprises the steps of dissolving the alkoxide in a solvent, optionally adding a catalytic amount of a base or acid, and hydrolyzing the metal compound to produce a gel. The solvent in the gel is exchanged with an extraction fluid, and the fluid in the gel is supercritical extracted to form an aerogel. The patent describes the preparation of amorphous, granular metal oxide aerogels, rather than monolithic forms.

Transparent metal oxide aerogel monoliths have been successfully formed by Lawrence Livermore National Laboratory, U.S. Pat. No. 5,395,805 to Droege (1995), in samples approximately 1 inch in diameter and 0.25 inches thick. This type of small monolith has extremely limited commercial catalytic applications due to its essentially inaccessible internal surface area. The pressure drop that is required to access the internal surface area is tremendously high. Per the LLNL patent, the fabrication of these small monoliths requires a containment vessel that is sealed in such a way as to be gas permeable.

Conventional honeycomb monolith chemical reaction beds for $NO_x$ reduction are typically at least 20 feet in depth (a 20 foot superficial gas flow path) and have the disadvantages of relatively high pressure drop, laminar flow in the honeycomb channels, and active catalyst surface limited to the surface washcoating of the catalyst impregnated on a ceramic honeycomb monolith.

Current catalyst pore structures depend on the micropore and macropore structure of the material of the base monolith and the ability to uniformly apply a washcoat of material over the monolith. Washcoat connections with the support via thin branches in small pores are highly vulnerable to thermal stress cracking. Typical internal surface areas for a titania monolith are approximately 50 $M^2$ per gram of material. The washcoat layer surface area is normally in the range of 100 to 200 $M^2$ per gram of material. Once a thin washcoat has been poisoned by materials such as alkalies and sulfur oxides, the catalyst will be deactivated.

A conventional composition for a $NO_x$ reduction catalyst that utilizes ammonia for its reduction agent is in the range of four to eight weight percent vanadium oxide or tungsten oxide coated over a titania monolith. The current commercial catalysts have a formulation tradeoff limitation between more Vanadium which increases the activity toward $NO_x$ reduction but also increases the activity of the unwanted oxidation reaction of $SO_2$ to $SO_3$. $SO_3$ combines with the ammonia to form ammonium bi-sulfate or ammonium sulfate which can cause corrosion and plugging of the downstream heat exchange equipment. The vanadium oxide allows activity toward $NO_x$ in lower operating temperature zones than the tungsten oxide.

Aerogel matrix composites using fibers dispersed within the bulk aerogel have been successfully formed by Battelle Memorial Institute U.S. Pat. No. 5,306,555 to Ramamkurthl (1994). These samples were formed with a high weight percentage of fibers, from 9 to 35, and had relatively low surface areas from 147 to 303 $M^2$ per gram of material.

Although these related patents discuss the formulation of metal oxide aerogels and methods of fabrication of small aerogel monoliths over long time periods (days), none address the practical application of aerogels as catalysts. Economic fabrication techniques for aerogel catalyst sections where the inherently large internal surface area characteristics can be fully exploited at low pressure drops in gas reacting systems are not addressed. The present invention addresses the need for a catalyst that allows selective catalyst reduction of $NO_x$ by using large ultra-thin honeycomb aerogel catalyst sections that allow the unique surface area of aerogels to be fully exploited at very low gas pressure drops.

OBJECTS AND ADVANTAGES

The following lists several objects and advantages of the invention:
(a) The aerogel mold design will allow the mold to serve multiple uses: as the frame for the pre-tensioned reinforcing fibers, as the gas porous mold during the polymerization (gelation) process, and as the gas porous mold during the supercritical drying process.
(b) Allowing the gas porous mold to serve as both the polymerization and drying vessel enables the matrix of reinforcing fibers and the aerogel inorganic matrix to achieve its maximum composite strength.
(c) The gas porous mold and its gas porous fingers which penetrate through the monolith, are the internal molds for the gas channels and will allow extremely rapid supercritical drying in minutes rather than hours or days.
(d) The ceramic tensioning caps that are the integral part of the pre-stressing system for reinforcing fibers used in the aerogel catalyst, also serve as a permanent, extremely tough handling surface for the large ultra-thin catalyst sections.

DRAWING FIGURES

| Reference Numbers in Drawings | |
|---|---|
| 10 flow through gas channel | 30 no Z axis reinforcement fibers |
| 12 Y axis direction reinforcing fiber | 32 Y axis reinforcement fibers |
| 14 X axis direction reinforcing fiber | 34 X axis reinforcement fibers |
| 20 mold shape alternative | 40 mold side |
| 22 hollow flow 'finger' | 42 tensioning cap |
| 24 mold shape alternative | 44 reinforcement fiber |
| 26 mold shape alternative | 50 aerogel matrix |
| 60 mold fingers | 52 tapered, porous, hollow 'finger' |
| 62 mold side plate | 74 extraction vessel side |
| 64 machined gas holes in mold plate | 70 gas flow through area of vessel |
| | 72 molds in vessel |

DESCRIPTION OF INVENTION

These innovations described in this patent application were first disclosed in disclosure documents 372026 and 373560 with recorded filing dates of Mar. 3, 1995 and Apr. 3, 1995 respectively.

Figure 1:
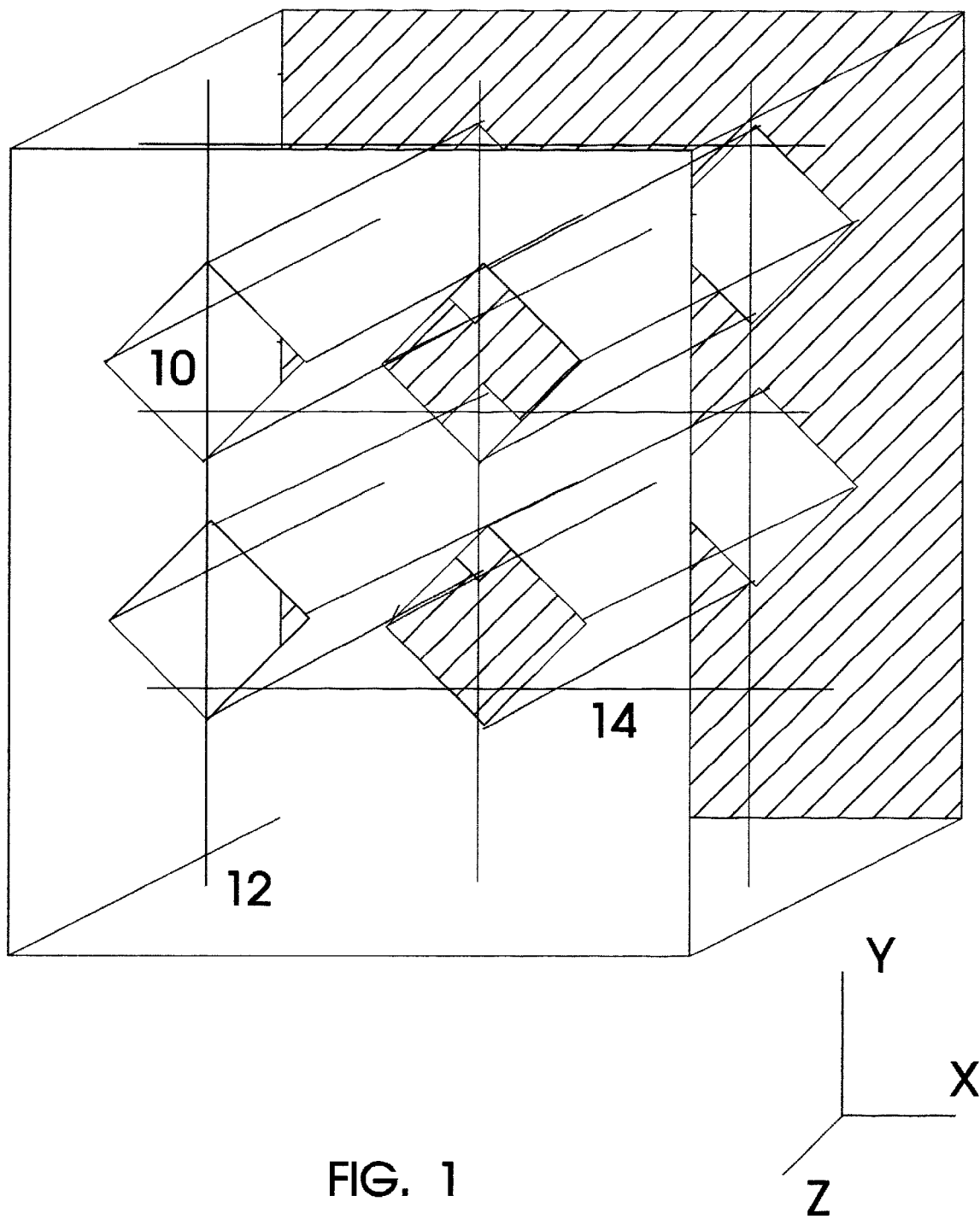
FIG. 1 shows an ultra thin fiber reinforced aerogel honeycomb monolith section with flow through gas channels.

The composite aerogel matrix honeycomb monolith is comprised primarily of the titanate anatase that is polymerized from the metal alkoxides involved in the transition metal mixed oxide aerogel process and some tape of reinforcing fiber that will be compatible with highly oxidizing high temperature environments. The ultra-thin honeycomb monolith has flow through gas channels 10 as illustrated by FIG. 1 that will allow the chemically reacting species to fully access and take complete advantage of the surface within the aerogel at a minimum pressure drop. Typical surface areas for these monolith aerogels are 400 to 1000 $M^2$ per gram of material. Because the aerogel is comprised of a homogeneous mixture of mixed transition metal oxide materials, all the internal surface area throughout the honeycomb matrix is a catalytic site. It approaches being the ultimate in a catalytic material, since all the surface area, both external and internal is reactive. The ultra-thin catalyst bed and its extremely low pressure drop has tremendous operating cost advantages for all low pressure, high gas flow reaction systems such as the selective catalytic reduction of $NO_x$ and complete oxidation of carbon monoxide and hydrocarbons.

Figure 2:
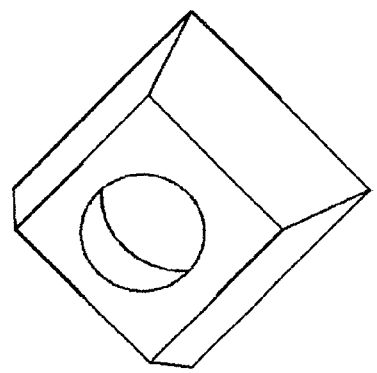
FIG. 2 shows alternative shapes for aerogel mold "fingers".
Figure 2:
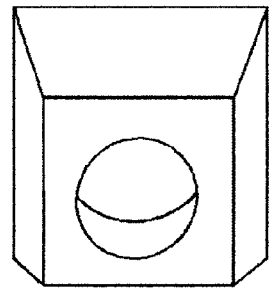
Figure 2:
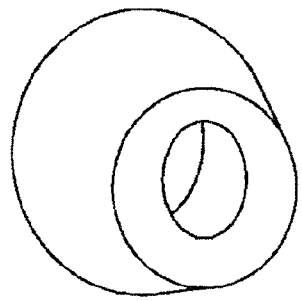
Figure 3:
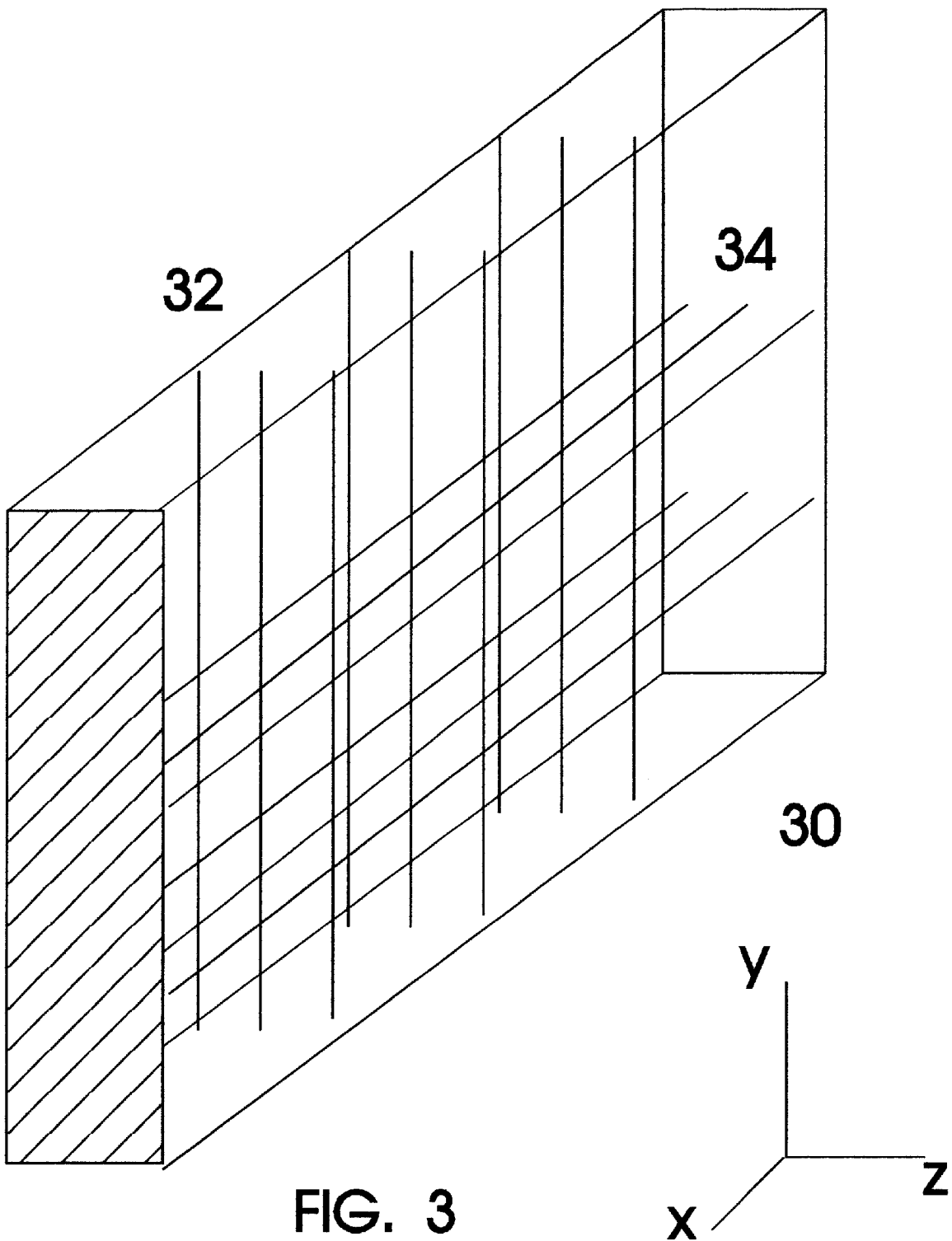
FIG. 3 shows the pre-stressed fiber reinforcement of an aerogel monolith.

The ability to fabricate a relatively brittle metal oxide Aerogel into thin honeycomb monolith sections and give it the capability to resist gas flows and thermal cycles is the key to the breakthroughs described above. Extrusion of the material would not appear practical due to the fact that this material polymerizes in a similar fashion to a thermoset resin, from a metal alkoxide to the titanate anatase form. The gas flow paths running in the z axis are also perpendicular to the necessary fiber reinforcement in the x and y axis as illustrated in FIG. 1, so the gas flow paths could not be extruded with the fiber reinforcement. Therefore the catalyst is formed in gas permeable molds with pre-tensioned fiber reinforcement in the x and y axis. The appropriate metal alkoxides will be thoroughly mixed, and water and the acid catalyst will be introduced before the mixture is poured into the mold. The molds have gas permeable "flow path fingers" in the z axis direction that will mold the gas flowpaths in the monolith. Typical shapes for these hollow flow fingers are shown in FIG. 2.

Figure 4:
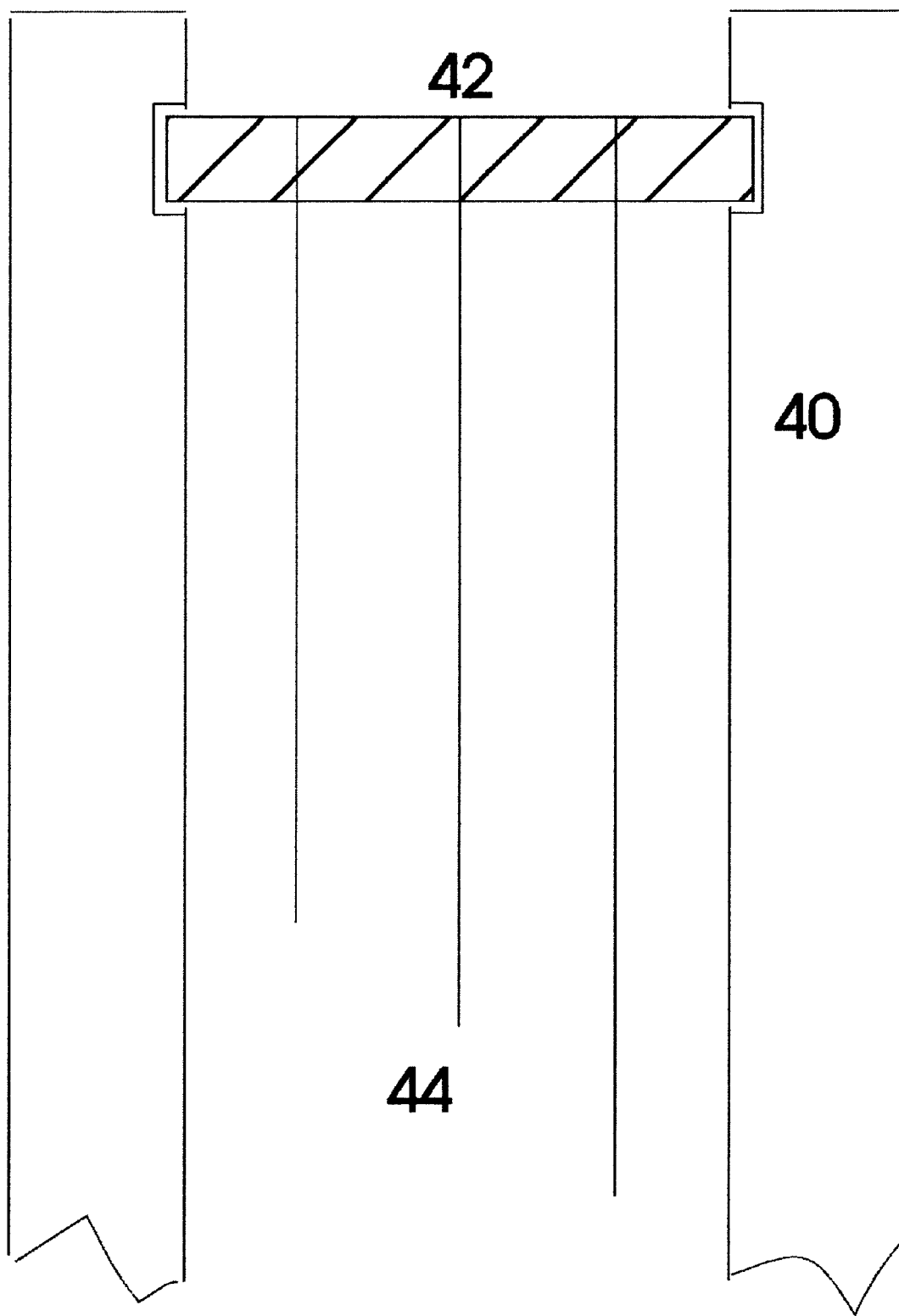
FIG. 4 shows an aerogel mold section showing ceramic tensioning cap and pre-stressed reinforcing fibers.
Figure 5:
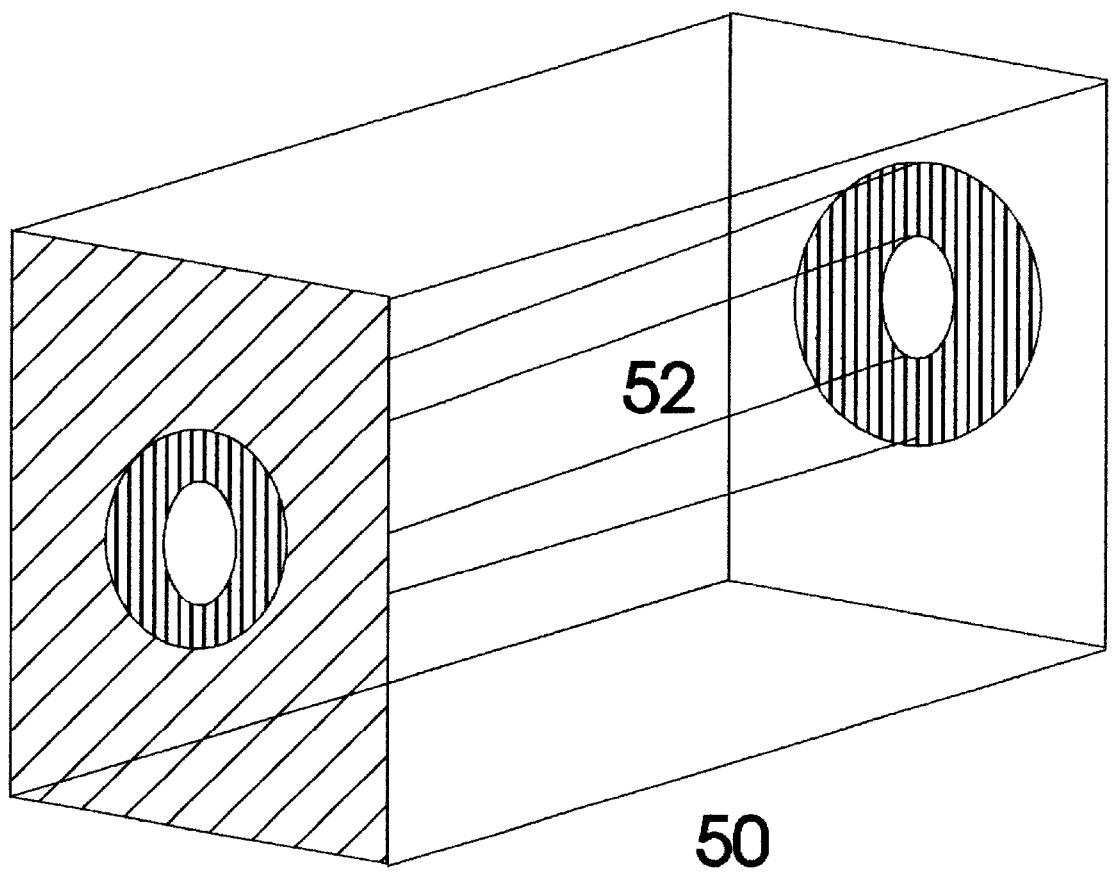
FIG. 5 shows section detail of the tapered, porous, hollow mold "fingers" surrounded by the aerogel matrix.
Figure 6:
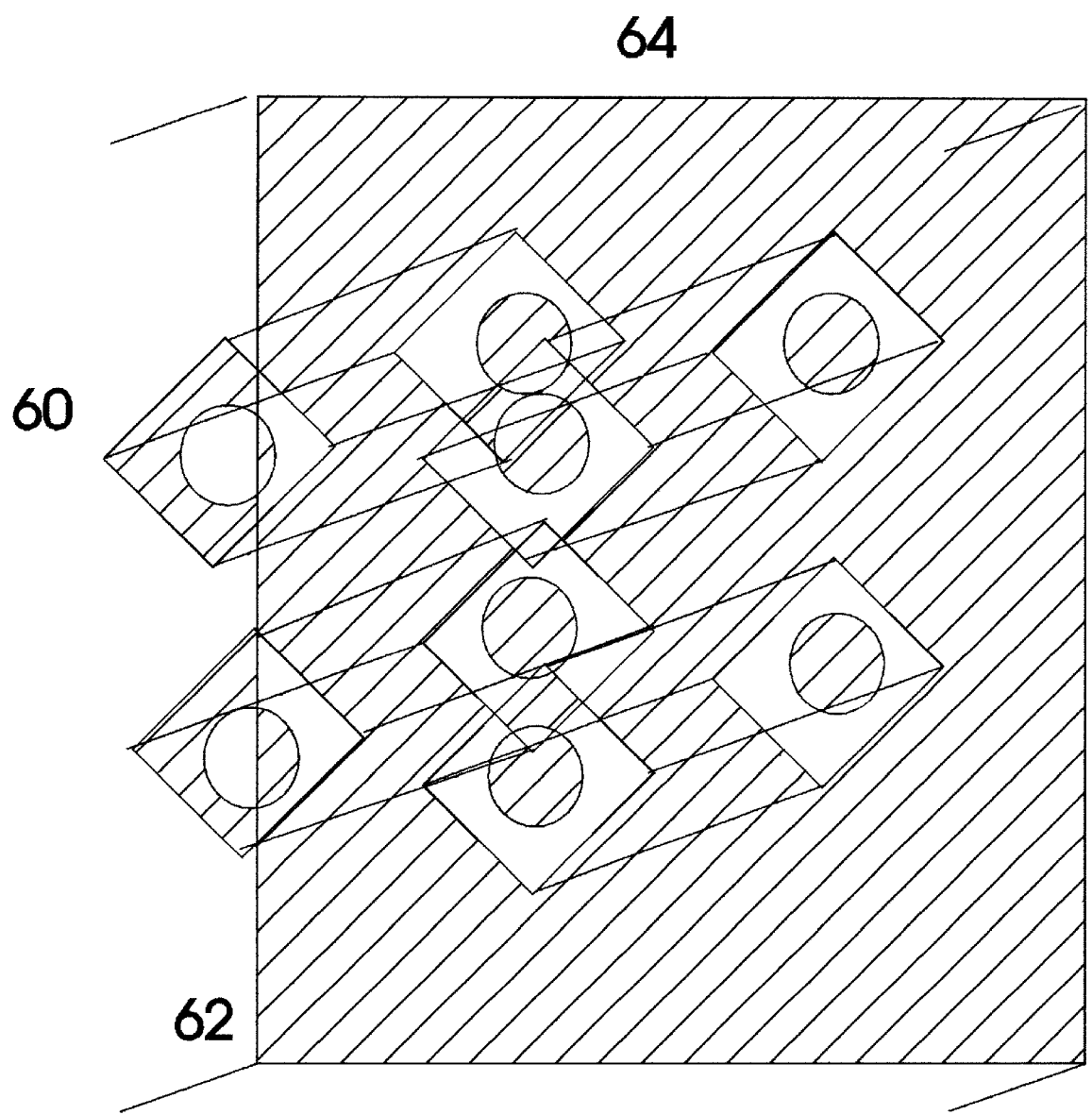
FIG. 6 shows a detailed section of the mold fingers projecting from one side of the aerogel mold.
Figure 7:
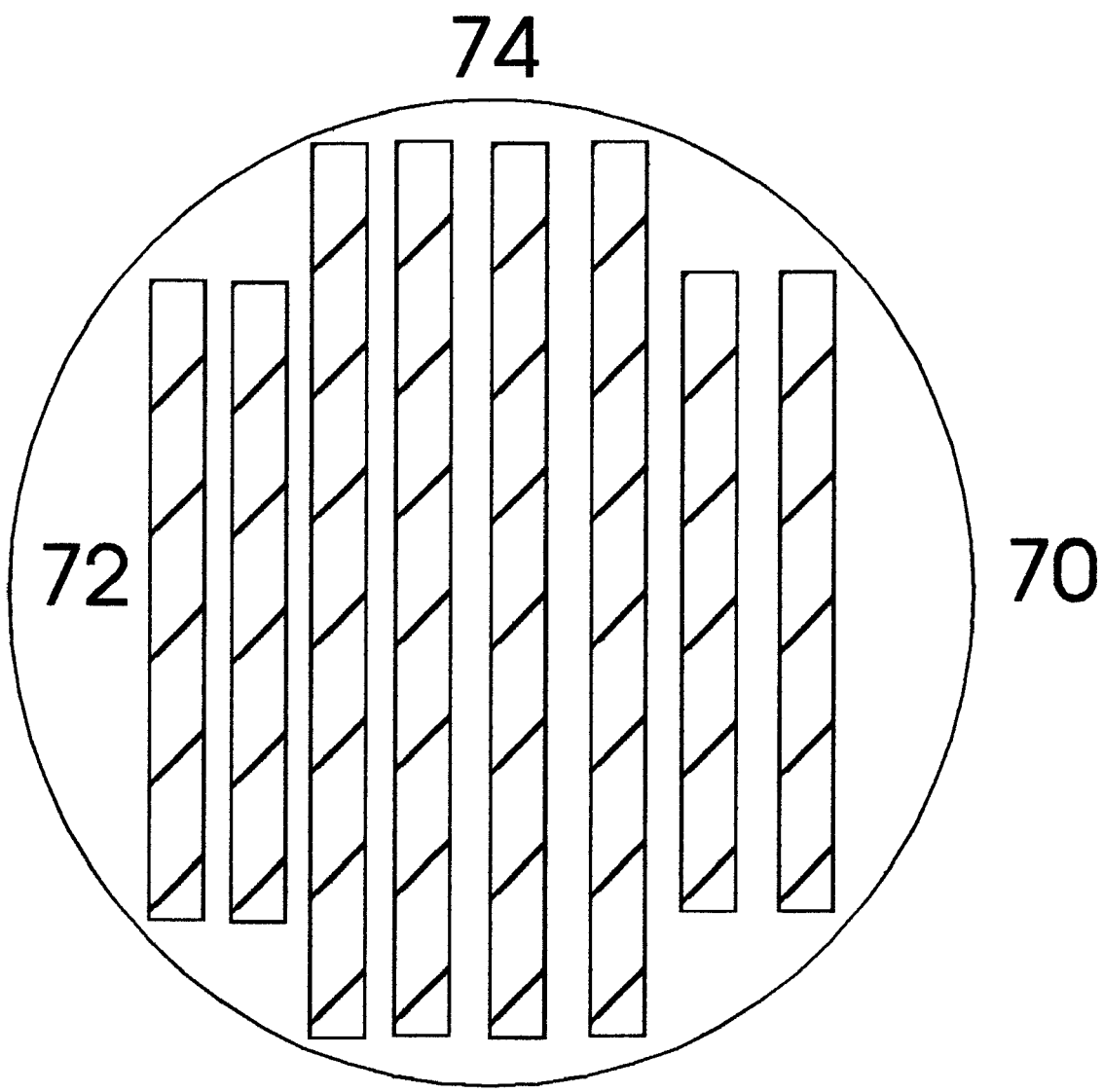
FIG. 7 shows a detail of the molds mounted in the extraction vessel to permit gas to flow past the molds.

The unique design of the aerogel mold will allow the mold to serve multiple uses as the container during the polymerization process, a frame for the pre-tensioned reinforcing fibers and a mold during the supercritical drying process. The stainless steel mold plates contain edge slots that hold the ceramic tensioning caps for the honeycomb monolith's outside edges that contain reinforcing fiber thread holes that are rounded to allow pre-tensioned fibers to be stung in a grid-like pattern similar to a tennis racquet. A typical cross section is shown in FIG. 4. The one meter square sides of the mold have gas flow holes and larger honeycomb mold support holes machined into the surface of the metal mold plates as shown in FIG. 6. Gas porous, hollow, tapered mold "fingers" are fixed to one side of the mold. The mold "fingers" are comprised of a gas porous material such as a sintered metal filter or ceramic filter as shown in detail in FIG. 5. The gas porous filters have holes that are small enough to prevent the catalyzed liquid ethoxides from weeping into the gas channel. The surface tension of the ethoxides prevents the weeping. The taper of the "finger" allows the mold to be withdrawn from the Aerogel inorganic polymer matrix without breakage. A mold release agent such as silicone is sprayed on the mold before the catalyzed ethoxides are introduced into the mold. The gas porous nature of the mold fingers allow rapid supercritical drying and replacement of the water hydrolysis product, ethanol, and organics within the inorganic polymer matrix with carbon dioxide or other supercritical gas. Once the gases have diffused through the porous filter, the hollow filter path, and holes in the stainless steel side mold plates, they are swept into the main stream of gas that flows past the molds that are contained by the supercritical fluid extraction vessel as illustrated in FIG. 7. The two unit operations of polymerization and supercritical drying are carried out in the Aerogel mold. This allows the inorganic Aerogel polymer matrix and glass reinforcing fibers to achieve their maximum composite strength since they are both polymerized and "cured" or dried without disturbance to the inorganic polymer matrix or the glass reinforced fibers.

OPERATION/WORKING INVENTION

The aerogel honeycomb mold is first prepared by spraying the entire inside surface with an appropriate mold release agent that will not interfere with the ethoxide condensation reaction such as a silicone lubricant. The mold is then assembled by sliding the ceramic tensioning caps per the illustration into the stainless edge slots in the mold. Long, thin needles are then used to thread the reinforcing fibers through the threading holes in the tensioning caps in a similar way to a tennis racquet being strung. These fibers are pre-tensioned to an appropriate amount of force to offset stress induced by the intended pressure drop service load. The pretensioned fiber holes in the mold tensioning caps are plugged in the mold to prevent ethoxide weepage before gelation is initiated.

A metal alkoxide solution is then prepared with the appropriate amount of each metal constituent and the gelation or polymerization reaction catalysed with acid and excess water per methods similar to those described in previous patent U.S. Pat. No. 5,395,805 to Droege (1995) or other literature sources such as Comprehensive Inorganic Chemistry, Reviews in Chemical Engineering, "Metal Oxide Aerogel Preparation . . . ", or "Advances in Colloid and Interface Science", "Inorganic Oxide Aerogels" and poured into the mold after mixing.

After gelation or polymerization, supercritical extraction of the remaining water and ethanol from the aerogel matrix is carried out. The ultra-thin honeycomb aerogel catalyst monolith is then removed and sintered per methods similar to those described in U.S. Pat. No. 5,395,805 to Droege (1995). The sintering removes the remaining organic compounds from the aerogel honeycomb matrix and maximizes the surface area.

The ultra-thin honeycomb matrix can then be used to catalyze gas phase reactions in high gas flow applications such as combustion turbine selective catalytic reduction of $NO_x$ by ammonia and complete oxidation of carbon monoxide in flue gas. The combination of the high space velocities, thin catalyst cross section, high mass transfer rates, high concentration of active catalytic materials, and extremely high aerogel surface area result in very selective catalytic reduction of $NO_x$ versus the unwanted side reaction of $SO_2$ to $SO_3$. Reaction bed pressure drop can also be reduced by an order of magnitude, thereby generating cost savings that quickly offset the cost the retrofit installation. This is especially valid in combustion turbine applications because combustion turbine power output and thermal efficiency is extremely sensitive to the turbine exhaust duct pressure drop.

Other applications in chemical process industries and advanced power production systems such as molten carbonate fuel cells would achieve equal operating cost savings by using this approach with transition metal oxide aerogels.

SUMMARY

The invention describes techniques for the internal molding and rapid drying of ultra-thin aerogel catalyst honeycomb monolith are compatible with the pre-stressed fiber reinforcing system and will allow the catalytic properties of the aerogel material to be full exploited.

I claim:

1. A method of forming and facilitating rapid drying of aerogel thin panel or monolith with internal molding and reinforced with pre-tensioned fibers comprising:

(a) providing a supercritical fluid extraction vessel;

(b) providing a mold with stainless steel side mold plates, and gas porous and hollow tapered mold fingers that are fixed to one or both sides of the stainless steel side mold plates;

(c) mounting the mold in the supercritical fluid extraction vessel in such a way that permits gas to flow past the mold;

(d) said gas porous, hollow, tapered mold fingers to have pores that are small enough to minimizing liquid weeping through the fingers, yet larger enough to allow gas diffusion and rapid drying of the aerogel thin panel or monolith;

(e) providing a mixture of metal alkoxides, water and a catalyst;

(f) spraying a mold release agent into the mold;

(g) pouring the mixture into the mold a polymerizing the mixture in the mold;

(h) subjecting the polymerized mixture to supercritical drying; and (i) withdrawing the mold from the supercritically died polymerized mixture to provide said aerogel thin panel or monolith.

2. A method for forming and to facilitating rapid drying of aerogel thin panel or monolith with internal molding of claim 1, wherein said gas porous and hollow tapered mold fingers material consists of materials such as sintered metal filters or porous ceramic material.

3. A method for forming and to facilitating rapid drying of an aerogel thin panel or monolith with internal molding of claim 1, wherein:

(a) the mold walls are notched near the edge to facilitate the placement of a tensioning cap before intoduction of the a mixture of metal alkoxides, water and a catalyst into the mold with stainless steel side mold plates; and (b) said tensioning cap serves as the permanent, extremely tough handling surface for the large thin panel or monolith sections.

* * * * *